United States Patent
Biswas et al.

(10) Patent No.: US 7,865,444 B1
(45) Date of Patent: Jan. 4, 2011

(54) LICENSE TRACKING AND MANAGEMENT

(75) Inventors: Sanjeev Kumar Biswas, Salt Lake (IN); Ravi Prakash Singh, Lucknow (IN)

(73) Assignee: Adobe Systems Incorporated, San Jose, CA (US)

( * ) Notice: Subject to any disclaimer, the term of this patent is extended or adjusted under 35 U.S.C. 154(b) by 683 days.

(21) Appl. No.: 11/761,532

(22) Filed: Jun. 12, 2007

(51) Int. Cl.
*G06F 21/00* (2006.01)

(52) U.S. Cl. .............................. 705/59; 705/51; 705/54; 705/64; 705/79; 713/150; 713/176; 726/20

(58) Field of Classification Search ............. 705/51–79; 726/2, 20; 713/150, 176
See application file for complete search history.

(56) References Cited

U.S. PATENT DOCUMENTS

| | | | | |
|---|---|---|---|---|
| 5,579,222 | A * | 11/1996 | Bains et al. | 717/167 |
| 5,671,412 | A * | 9/1997 | Christiano | 707/104.1 |
| 6,189,146 | B1 * | 2/2001 | Misra et al. | 717/177 |
| 7,171,662 | B1 * | 1/2007 | Misra et al. | 717/177 |
| 7,216,363 | B2 * | 5/2007 | Serkowski et al. | 726/20 |
| 7,272,500 | B1 * | 9/2007 | Walker | 701/213 |
| 2004/0044630 | A1 * | 3/2004 | Walker et al. | 705/59 |
| 2004/0054909 | A1 * | 3/2004 | Serkowski et al. | 713/176 |
| 2004/0199760 | A1 * | 10/2004 | Mazza et al. | 713/150 |

\* cited by examiner

*Primary Examiner*—Pierre E. Elisca
*Assistant Examiner*—Shahid Kamal

(57) ABSTRACT

Example embodiments herein include a license manager process that receives a license query from a server device. The license query requests usage data associated with a permanent license on a client device. In response to receiving the license query, the license manager procures the usage data associated with the permanent license on the client device. The license manager then transmits the usage data associated with the permanent license to the server device. Furthermore, the license manager receives a revocation request from the server device. In this manner, the revocation request is received in response to transmitting the usage data associated with the permanent license to the server device. In turn, the license manager revokes the permanent license that was indicated in the revocation request to disable use of the respective application on the client device.

18 Claims, 9 Drawing Sheets

LICENSE TRACKING AND MANAGEMENT

BACKGROUND

Conventional software licenses are specific computer programs and files that include the permissions, rights and restrictions imposed on software applications. Under a software license, the licensee is permitted to use the licensed software in compliance with the specific terms of the license. Thus, with most conventional commercial software applications, a license is necessary to allow for the proper (and legal) execution of the software application on a user's computers.

A widely used variety of software licenses are floating licenses. Floating licenses allow multiple users to share use of a corresponding application on multiple computers (e.g., as opposed to a permanent license which remains on a single user's computer and cannot be transferred and distributed among multiple computers). For example, when a user finishes using the software and, thus, no longer needs the corresponding floating license, another user can acquire and implement that particular license in order to use the corresponding software application on their computer.

Typically, conventional floating licenses can be configured for implementation and distribution in a network environment such as, for example, in a Wide Area Network (WAN) associated with a business or university. Moreover, a license server (e.g., in conjunction with the oversight of a network or system administrator) can control access to the floating licenses by monitoring the active licenses and then reacquiring the licenses when not being used or when the licenses are needed elsewhere (e.g., on other computers in the same network environment).

SUMMARY

Conventional software license management and administration applications suffer from a variety of deficiencies. In particular, conventional license management applications are unable to track the usage of and manage permanent software licenses in a network environment (e.g., Local Area Network "LAN", WAN, the Internet, etc.). It is well known that such conventional license management applications have the capability of managing, reacquiring and redistributing floating software licenses. However, no system or application exists that can enable a license server (e.g., and a network or system administrator) to monitor the usage of permanent licenses in a network environment. Furthermore, conventional license management applications are not equipped to act upon, via a license server, such permanent license usage information to make a determination on whether or not to revoke the corresponding permanent licenses.

Embodiments disclosed herein can significantly overcome such deficiencies and/or other deficiencies in the prior art. For example, embodiments herein include a method for tracking, managing and/or revoking permanent licenses on client computers from a server computer (e.g., license server) in a network environment (e.g., LAN). Additionally, according to embodiments herein, the method is able to manage and revoke permanent licenses on client devices by tracking and monitoring usage information related to the permanent licenses and their corresponding software applications. For example, in one embodiment a server device tracks the usage of an application (e.g., Adobe Acrobat®) on a client device and determines, based on the infrequent use of the application on the client device per the usage data, to remotely revoke the permanent license on the client device.

In particular, according to such embodiments, an agent process (as part of a license manager process) resides, in part, on the client devices in the network environment and collects the usage data and statistics related to the respective applications that execute on the client devices. The agent process communicates with the server device (e.g., license server) to supply the server device with the usage data and to send and receive instructions related to the activation and/or deactivation (e.g., also known as the checking out or checking in, respectively) of the permanent licenses on the client device. According to one example embodiment, the agent process transmits the usage data and statistics to the server device at predetermined intervals based on the occurrence of an event (e.g., once every day or upon the powering up of the client device). Alternatively, as in one embodiment, the agent process transmits the usage data to the server device in response to receiving a request for the usage data from the server device.

In another example embodiment, the server device (e.g., via the license manager process) processes the usage data related to the permanent license upon receipt from the client device. In one example configuration, the server device presents the usage data to a user (e.g., network or system administrator) in a graphical user interface (GUI). The user, in turn, provides instructions to the server device regarding the management and administration of the permanent licenses based on the information displayed in the graphical user interface. One such instruction includes a revocation request which instructs the server device to revoke the permanent license on the client machine and to subsequently reacquire the license. Alternatively, the license manager processes the usage data and automatically determines whether or not to revoke the respective license without user interaction, according to one example embodiment. In such an embodiment, the license manager compares the usage data against predetermined threshold values such as, for example, a frequency of use value and a staleness value (e.g., to determine whether the application associated with the respective license has been used within a certain timeframe).

In accordance with embodiments disclosed herein, a license manager receives a license query from a server device (e.g., license server). The license query requests usage data associated with a permanent license on a client device. In such an embodiment, the permanent license enables use of a respective application on the client device. In response to receiving the license query, the license manager procures the usage data associated with the permanent license on the client device. In one example embodiment, the database is a Trusted Storage (TS) database (e.g., which is used for license file storage) and/or a Cache Database (also commonly known as a "PCD") which is a Structured Query Language Lite (SQLite) database. Furthermore, the license manager transmits the usage data associated with the permanent license to the server device for further processing.

In another example embodiment, the license manager receives a revocation request from the server device. In this manner, the revocation request is received in response to transmitting the usage data associated with the permanent license to the server device. The revocation request further indicates to the client device which permanent license to revoke. In turn, the license manager revokes the permanent license that was indicated in the revocation request to disable use of the respective application on the client device. According to another example embodiment, the server device reacquires the permanent license upon revocation on the client device.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated of San Jose, Calif.

As discussed above, techniques herein are well suited for use in license tracking and management applications. However, it should be noted that embodiments herein are not limited to use in such applications and that the techniques discussed herein are well suited for other applications as well.

Note that each of the different features, techniques, configurations, etc. discussed herein can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments herein include a license manager that tracks, manages and/or revokes permanent licenses on client devices from a server device (e.g., license server) in a network environment (e.g., LAN, WAN, the Internet, etc.). The license manager tracks and monitors usage information related to the permanent licenses and their corresponding software applications on the client devices. In addition, according to example embodiments herein, the license manager is able to present the usage information to a network or system administrator in a graphical user interface so that a determination can be made on whether or not to revoke the permanent license on the client device. Furthermore, as in one example embodiment, the license manager remotely revokes the permanent licenses on the client devices either automatically or as instructed by the user administrator.

Figure 1:
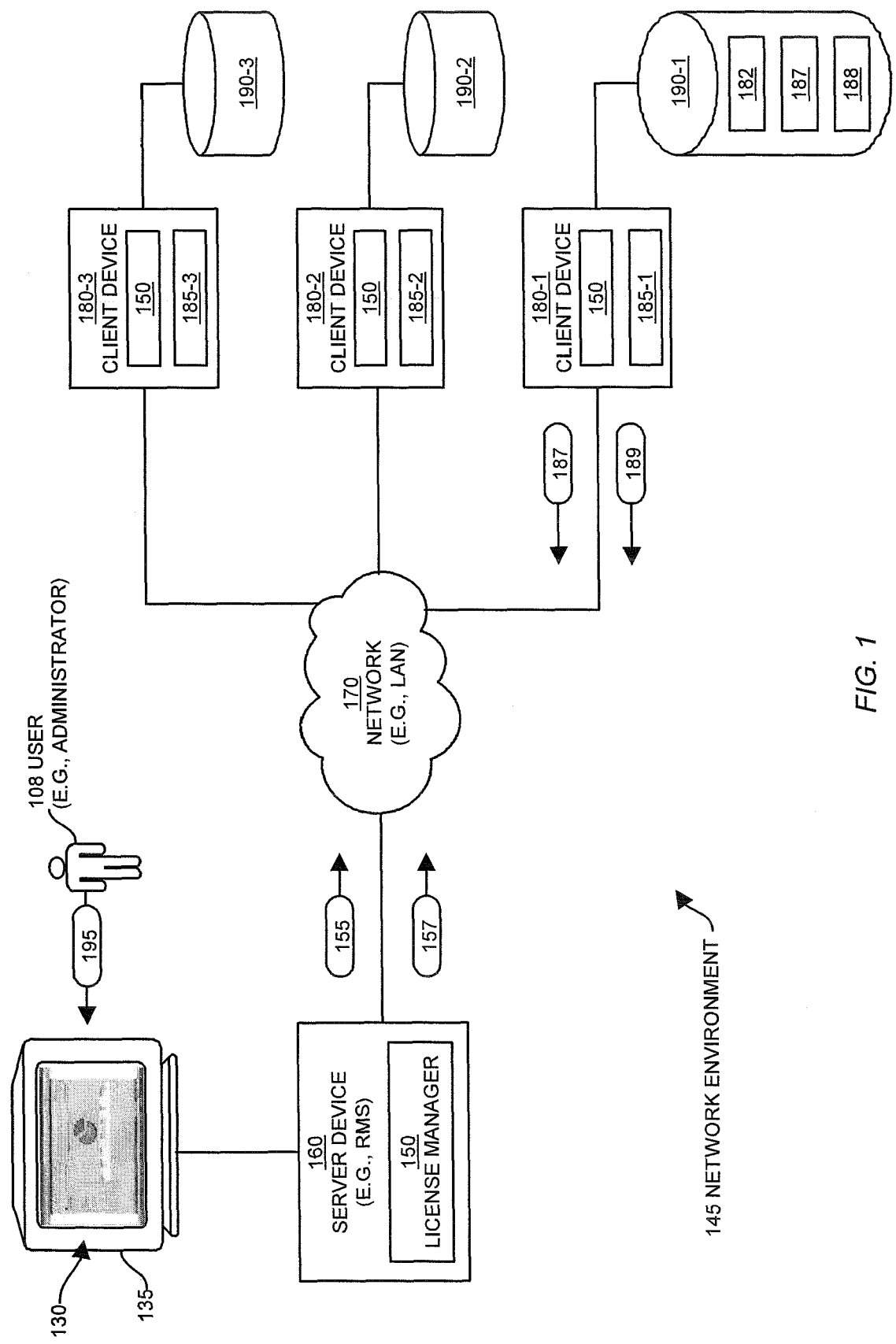
FIG. 1 is an example block diagram of a network environment including a server device in communication with client devices across a network in accordance with one example configuration according to embodiments herein.

FIG. 1 is an example block diagram of a network environment 145 including a server device 160 (e.g., Rights Management Server "RMS") in communication with client devices 180-1, 180-2 and 180-3 (hereinafter generally referred to as client devices 180, with particular attention to client device 180-1 as it will be specifically referred to when discussing the following example embodiments) across a network 170 (e.g., a Local Area Network "LAN", the Internet, a wireless network, etc.) in accordance with one example embodiment. Server device 160 and client devices 180 have a license manager 150 that performs license tracking and management functions in the network environment 145. Note that license manager 150 may reside wholly, or in part, on server device 160 and/or client device 180-1, 180-2 or 180-3.

Still referring to the example embodiment of FIG. 1, server device 160 has a display 135 that displays, as part of the implementation of license manager 150, a license management interface 130 (e.g., a web browser or any other graphical user interface) to enable a user 108 (e.g., network administrator) to interact with license manager 150.

In addition, client devices 180-1, 180-2 and 180-3 each have access to a respective database 190-1, 190-2 and 190-3, which may reside locally in each client device or, as in an alternate embodiment, the client devices 180 can access the databases 190 from across network 170. According to one example embodiment, and as generally known in art, the databases 190 may include a Trusted Storage (TS) configuration and/or a Page Cache Database (PCD) configuration. As will be discussed in more detail below, database 190-1 also comprises a usage counter 188 for tracking and monitoring usage of the application 185-1 on client device 180-1.

Referring again to FIG. 1, each client device 180-1, 180-2 and 180-3, has a respective application 185-1, 185-2 and 185-3 (e.g., Adobe Acrobat®) that has a corresponding license 182 which, when activated on a client device 180, is required for the application to execute, at least in part, on each client device 180. For instance, in the example embodiment of FIG. 1, client device 180-1 has the license 182 for corresponding application 185-1 and, thus, client device 180-1 is able to execute at least part of application 185-1. As shown in the example embodiment shown in FIG. 1, the license 182 is stored and is accessible from database 190-1 associated with client device 180-1. Furthermore, as will be discussed in more detail below, usage data 187 is stored and is accessible from database 190-1 associated with client device 180-1. The usage data 187 contains various statistics and information related to the application 185-1 (and its usage on client device 180-1) and corresponding permanent license 182.

The implementation, interoperability and/or general functionality of the license manager 150 with respect to FIG. 1 are discussed in more detail below in conjunction with the discussion of the flowcharts in FIGS. 3-9.

Figure 2:
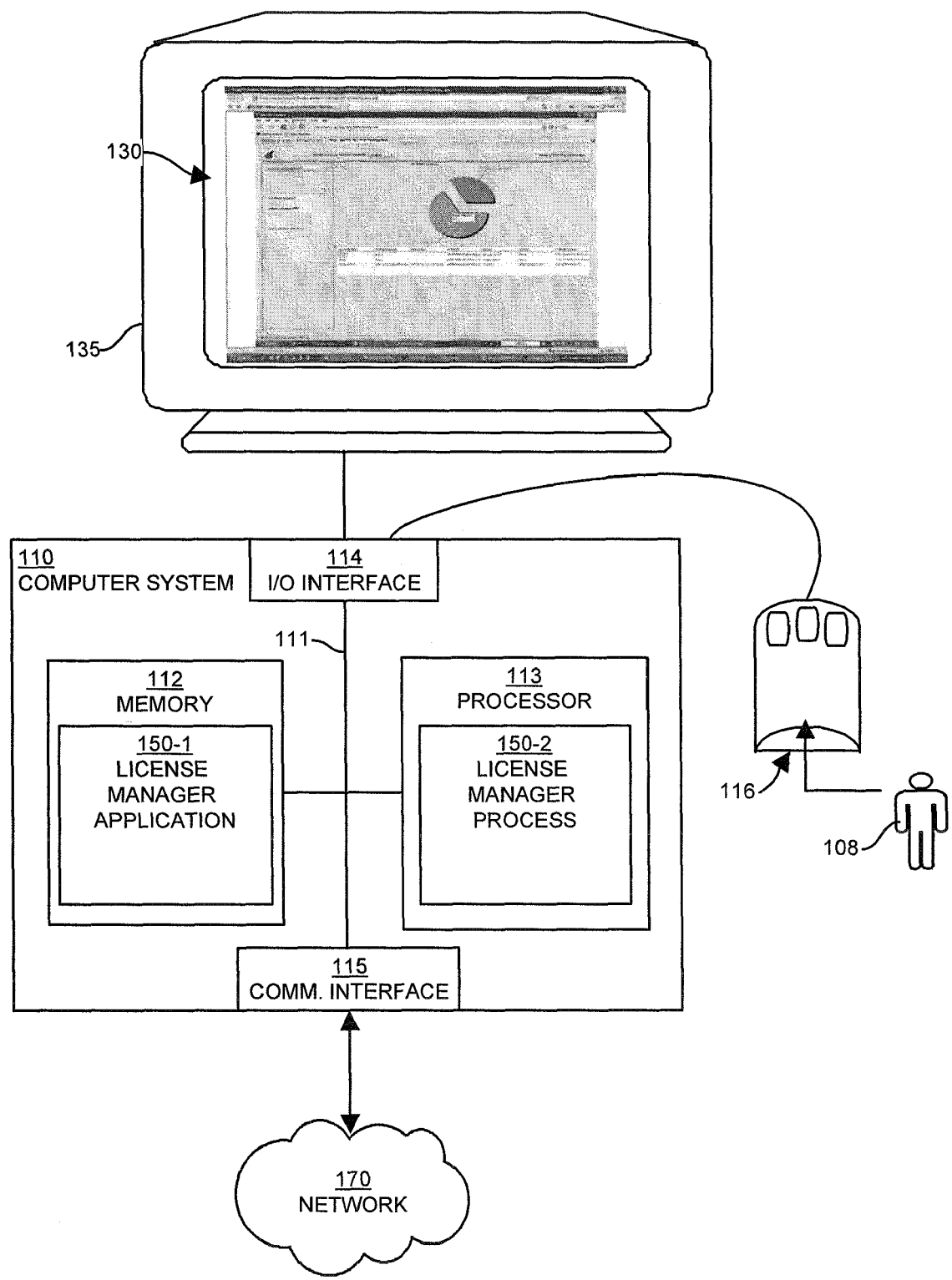
FIG. 2 is an example block diagram of a computer system configured with a license manager application including a license manager process in accordance with one example configuration according to embodiments herein.

FIG. 2 is a block diagram illustrating example architecture of a computer system 110 (e.g., server device 160 and/or client devices 180, 181 and 182) that executes, runs, interprets, operates or otherwise performs a license manager application 150-1 and license manager process 150-2. The computer system 110 may be any type of computerized device such as a personal computer, workstation, portable computing device, console, laptop, network terminal, client, etc.

As shown in the example of FIG. 2, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a pointing device, keyboard, mouse, etc.) couples to processor 113 through I/O interface 114, and enables a user 108 (e.g., network administrator) to provide input commands and generally control the license management interface 130 (e.g., a graphical user interface) that the license manager application 150-1 and license manager process 150-2 provide for display on display 135. The communications interface 115 enables the computer system 110 to communicate with other devices (e.g., other computers such as client devices 181, 182 and 183) over a respective a network 170 (e.g., a local area network, the Internet, etc.).

The memory system 112 can generally be any type of computer readable medium and (in this example) is encoded with a license manager application 150-1. The license manager application 150-1 may be embodied as software code such as data and/or logic instructions (e.g., code stored in the memory or on another computer readable medium such as a removable disk) that supports processing functionality according to different embodiments described herein.

During operation of the computer system 110, the processor 113 accesses the memory system 112 via the interconnect 111 in order to launch, run, execute, interpret or otherwise perform the logic instructions of the license manager application 150-1. Execution of license manager application 150-1 in this manner produces processing functionality in a license manager process 150-2. In other words, the license manager process 150-2 represents one or more portions of runtime instances of the license manager application 150-1 (or the entire application 150-1) performing or executing within or upon the processor 113 in the computerized device 110 at runtime.

It should be noted that the license manager process 150-2 can reside wholly, or in part, in the server device 160, the client devices 180, 181 and 182, and/or any network application associated with network 170.

FIGS. 3-9 present flow charts according to embodiments herein. The rectangular elements are herein denoted "steps" and represent computer software instructions or groups of instructions. The flow diagrams do not necessarily depict the syntax of any particular programming language. Rather, the flow diagrams illustrate the functional information one of ordinary skill in the art could use to fabricate circuits or to generate computer software to perform the processing required in accordance with the present invention.

It should be noted that many routine program elements, such as initialization of loops and variables and the use of temporary variables are inherent in the flowcharts. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 3:
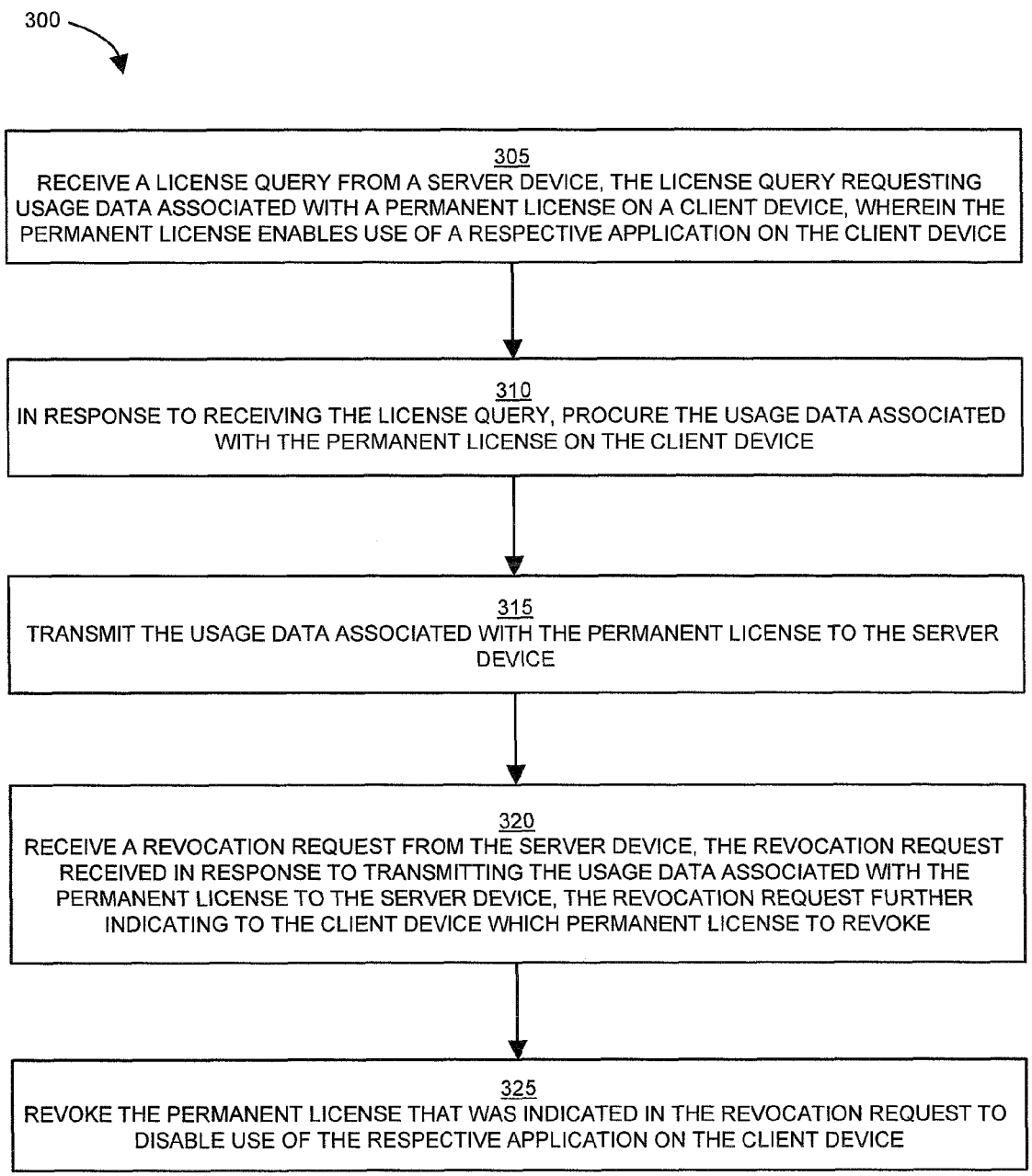
FIG. 3 is a flow chart of processing steps performed by a license manager from the perspective of the client device according to embodiments herein.

Now, more specifically, FIG. 3 is a flow chart 300 of processing steps that shows processing operations performed by the license manager 150 from the perspective of the client device 180-1 in accordance with one example embodiment.

In step 305, the license manager 150 receives a license query 155 from a server device 160. The license query 155 requests usage data 187 associated with a permanent license 182 on client device 180-1. In this embodiment, the permanent license 182 enables use of a respective application 185-1 on the client device 180-1. For instance, as shown in the example embodiment of FIG. 1, the server device 160 (e.g., license server) transmits the license query 155 to client device 180-1 across network 170 (e.g., WAN).

In step 310, in response to receiving the license query 155, the license manager 150 procures the usage data 187 associated with the permanent license 182 on the client device 180-1. As will be discussed in more detail below, the client device 180-1 (via license manager 150) can query a database 190-1 such as a Trusted Storage (TS) database and/or a Page Cache Database (PCD) in order to procure the usage data 187 in accordance with one example embodiment.

In step 315, the license manager 150 transmits the usage data 187 associated with the permanent license 182 to the server device 160. FIG. 1 shows the client device 180-1 transmitting the usage data 187 to the server device 160 across network 170 (e.g., LAN).

An example scripting language format (e.g., XML code) used for storing and transmitting the usage data 187 in accordance with one example embodiment of the license manager 150 is shown in Table I:

TABLE I

```
<?xml version="1.0" encoding="UTF-8"?>
<TSView>
  <LicenseCount>1</LicenseCount>
  <Licenses>
```

TABLE I-continued

```
    <License>
        <Type>Permanent</Type>
        <Expiry>permanent</Expiry>
        <EntID>EID=Entitlement ID Sample</EntID>
        <Server>https://sample.server.com</Server>
        <Product>NAME=Product Name Sample=1.0</Product>
        <Fid>4BE4F69COD27A53F6-alm team</Fid>
        <CheckOut>10:01:22;12:12:2006</CheckOut>
    </License>
</Licenses>
<Overdraft>0</Overdraft>
<Permanent>1</Permanent>
<Trial>0</Trial>
</TSView>
```

As shown in the example of Table 1, the XML file format includes fields such as, for example, license type (e.g., "<Type>"=permanent), expiration time (e.g., "<Expiry>"=permanent) and server location (e.g., "<Server>"=https://sample.server.com), to name a few. It should be noted that the example script of Table 1 is shown for purposes of example only, and can include more, less and/or different fields as those outlined in Table 1.

In step 320, the license manager 150 receives, at the client device 180-1, a revocation request 157 from the server device 160. The license manager 150 receives the revocation request 157 in response to transmitting the usage data 187 associated with the permanent license 182 to the server device 160. The revocation request 157 further indicates to the client device 180-1 which permanent license to revoke (e.g., permanent license 182 in the example embodiment of FIG. 1). As shown in FIG. 1, server device 160 (via license manager 150) transmits the revocation request 157 to the client device 180-1 across network 170 in order to revoke the permanent license 182.

In step 325, the license manager 150 revokes the permanent license 182 that was indicated in the revocation request 157 to disable use of the respective application 185-1 on the client device 180-1. For example, suppose that the permanent license 182 on client device 180-1 is associated with the Adobe Acrobat® application (e.g., application 185-1). Upon receiving the revocation request 157 from the server across network 170, the license manager 150 revokes the permanent license 182 associated with the Adobe Acrobat® application. Thus, upon revocation of the permanent license 182, a user of client device 180-1 will no longer be able to use Adobe Acrobat® until another license has been reactivated on client device 180-1.

In another example embodiment, the license manager 150 releases the permanent license 182 associated with the respective application 185-1 from the client device 180-1. By releasing the permanent license 182 from the client device 180-1, the license manager 150 is able to reacquire the permanent license 182 at the server device 160.

Figure 4:
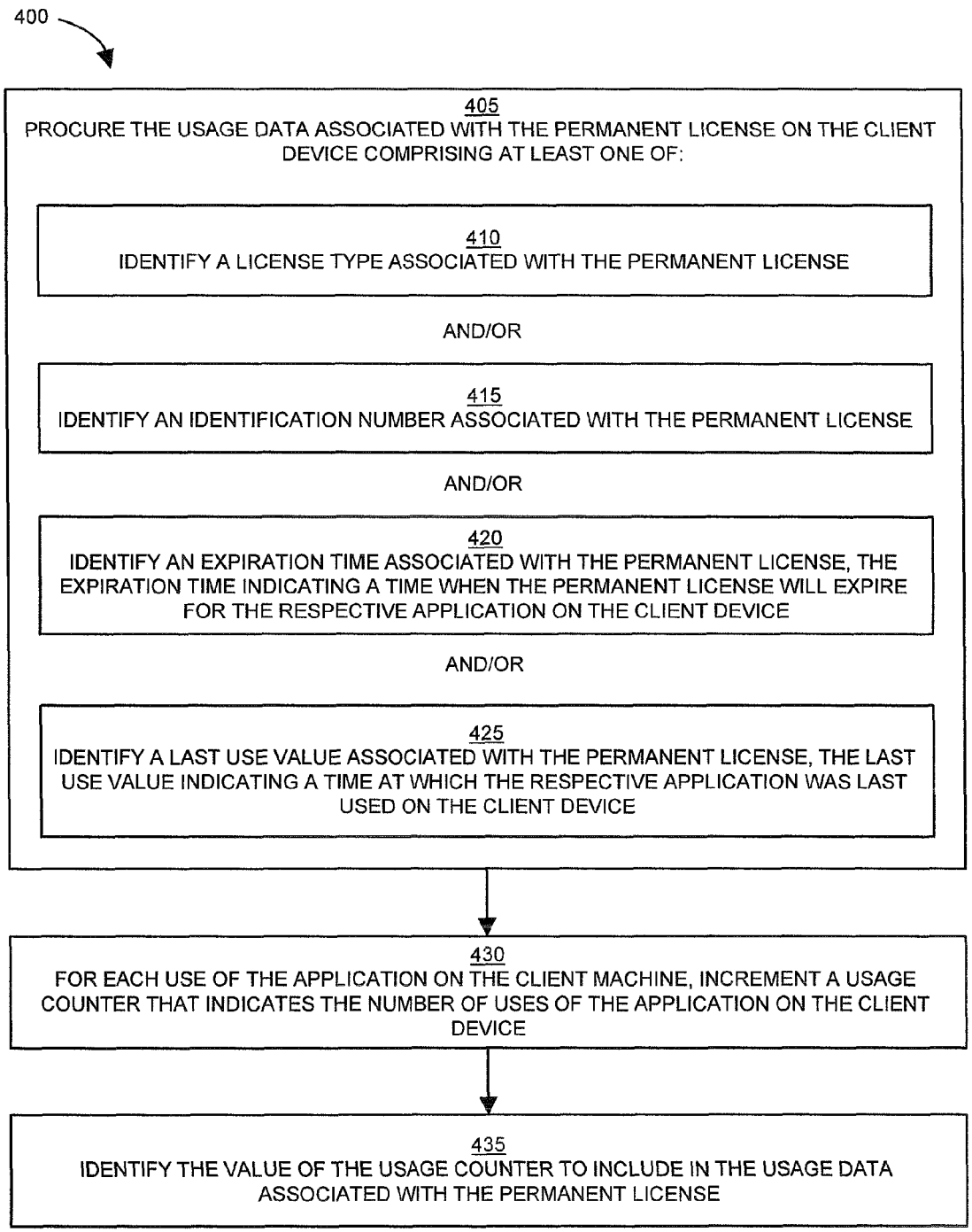
FIG. 4 is a flow chart of processing steps performed by a license manager from the perspective of the client device according to embodiments herein.

FIG. 4 is a flow chart 400 of processing steps that shows processing operations performed by the license manager 150 from the perspective of the client device 180-1 in accordance with one example embodiment.

In step 405, the license manager 150 procures the usage data 187 associated with the permanent license 182 on the client device 180-1. Processing of step 405 is similar to the processing of step 310 discussed above.

In step 410, the license manager 150 identifies a license type associated with the permanent license. For example, the license type (e.g., the "<Type>" field as shown in Table I) can include a permanent license type, a floating license type, a trial license type, etc. The license type informs the license server and/or system administrator as to which type of license to monitor and manage.

In step 415, the license manager 150 identifies an identification number associated with the permanent license 182. The identification number is typically a serial ID number associated with a software license such as the Entitlement ID number or the Fulfillment ID number.

In step 420, the license manager 150 identifies an expiration time associated with the permanent license 182. The expiration time indicates a time when the permanent license will expire for the respective application 185-1 on the client device 180-1. As a consequence, when a license expires on a computer, the corresponding application is no longer available for use on the computer until the license is renewed or a new license is acquired.

In step 425, the license manager 150 identifies a last use value associated with the permanent license 182. The last use value indicates a time at which the respective application 185-1 was last used on the client device 180-1. For example, in one embodiment the last use value is used in determining whether or not to revoke the permanent license 182. If, for example, the application 185-1 associated with the permanent license 182 has not been used for an extended amount of time, the permanent license may be revoked so that another client device (e.g., client device 180-2 or 180-3 in network environment 145) can utilize the permanent license 182.

In step 430, for each use of the application 185-1 on the client machine 180-1, the license manager 150 increments a usage counter 188 that indicates the number of uses of the application 185-1 on the client device 180-1. The usage counter 188 can be used to determine the frequency of use of the application 185-1 on the client device 180-1 over a period of time. The frequency of use of the application 185-1 can serve to be valuable information for determining whether or not to revoke the associated permanent license 182.

In step 435, the license manager 150 identifies the value of the usage counter 188 to include in the usage data 187 associated with the permanent license 182. Thus, when procuring the usage data 187, the license manager 150 reads the usage counter 188 to retrieve the value representing the number of uses of the application 185-1 (e.g., the number of uses since the permanent license 182 was activated on the client device 180-1), in accordance with an example embodiment. The value of the usage counter 188 is then included in the usage data 187 when transmitted to the server device 160 across network 170, as shown in FIG. 1.

Figure 5:
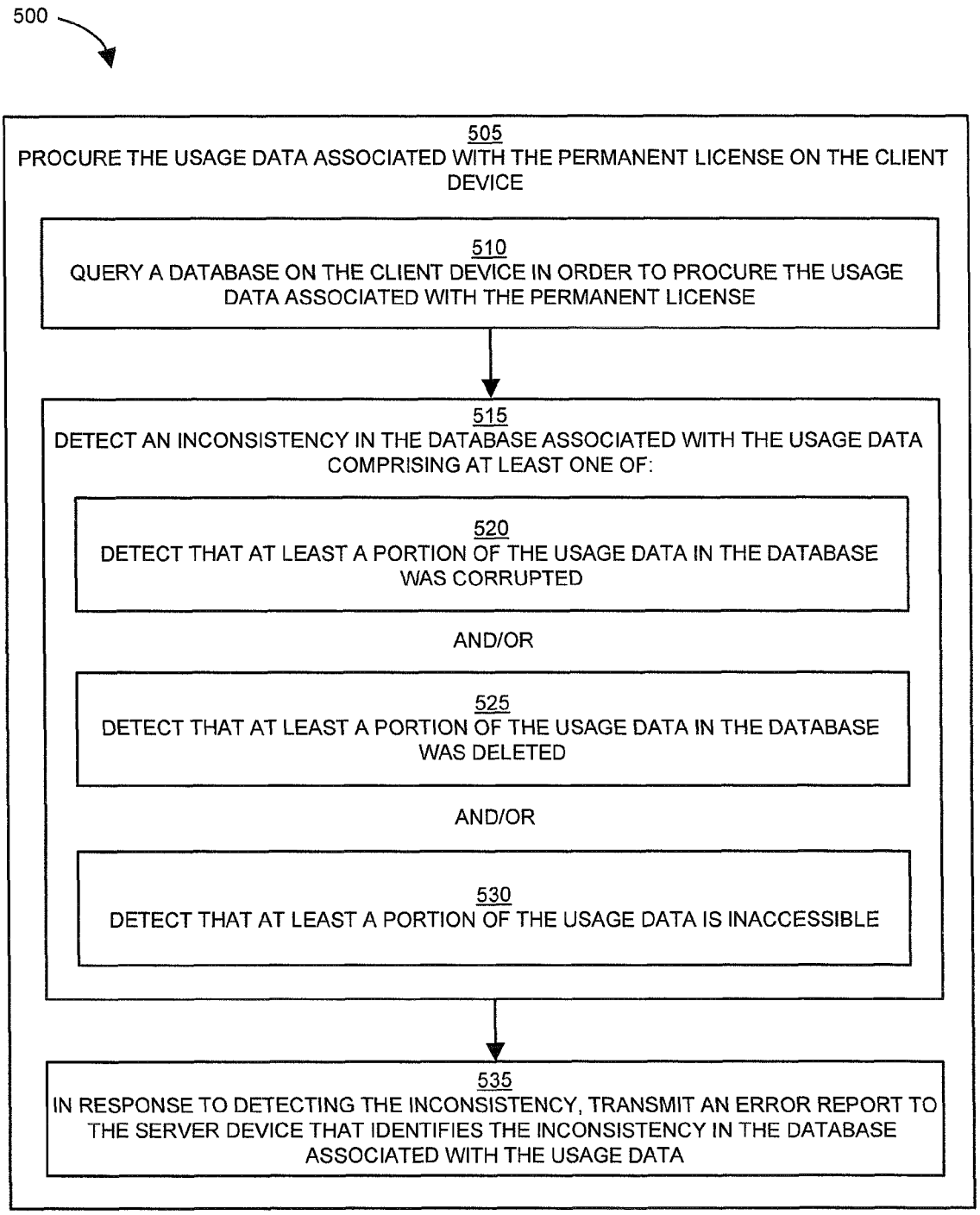
FIG. 5 is a flow chart of processing steps performed by a license manager from the perspective of the client device according to embodiments herein.

FIG. 5 is a flow chart of processing steps that shows processing operations performed by the license manager 150 from the perspective of the client device 180-1 in accordance with one example embodiment.

In step 505, the license manager 150 procures the usage data 187 associated with the permanent license 182 on the client device 180-1. Processing of step 505 is similar to the processing of steps 310 and 405 discussed above.

In step 510, the license manager 150 queries a database 190-1 on the client device 180-1 in order to procure the usage data 187 associated with the permanent license 182. As shown in the example embodiment of FIG. 1, the license manager retrieves the usage data 187 from database 190-1. Typically, as in the example embodiment of FIG. 1, the database 190-1 resides in the client device 180-1. However, in an alternate embodiment, the license manager 150 accesses the database on a separate device from across network 170 to procure the usage data 187. As previously mentioned, in one example embodiment the database 190-1 can be a Trusted Storage (TS) database and/or a Page Cache Database (PCD) commonly known in the art.

In step 515, the license manager 150 detects an inconsistency in the database 190-1 associated with the usage data 187. Details of the license manager 150 detecting the inconsistency in the database 190-1 are discussed in more detail in the steps below.

In step 520, the license manager 150 detects that at least a portion of the usage data 187 in the database 190-1 was corrupted. For example, a portion of the usage data 187 may have been overwritten by another process on the client device 180-1.

In step 525, the license manager 150 detects that at least a portion of the usage data 187 in the database 190-1 was deleted.

In step 530, the license manager 150 detects that at least a portion of the usage data 187 is inaccessible. For example, the license manager 150, for some reason, may no longer have access rights and privileges to the database 190-1.

In step 535, in response to detecting the inconsistency (e.g., corruption, deletion and/or inaccessibility with respect to the usage data 187), the license manager 150 transmits an error report 189 to the server device 160 that identifies the inconsistency in the database 190-1 associated with the usage data 187. For example, assume that the license manager 150 detects that portions of the usage data 187 have been deleted. In response to detecting this inconsistency in the database 190-1, per the example embodiment of FIG. 1 the license manager 150 transmits, from the client device 180-1, the error report 189 to server device 160 across network 170 (e.g., LAN). The error report 189, in turn, will alert the server device 160 or user 108 (e.g., network administrator) about the inconsistency detected in database 190-1.

Figure 6:
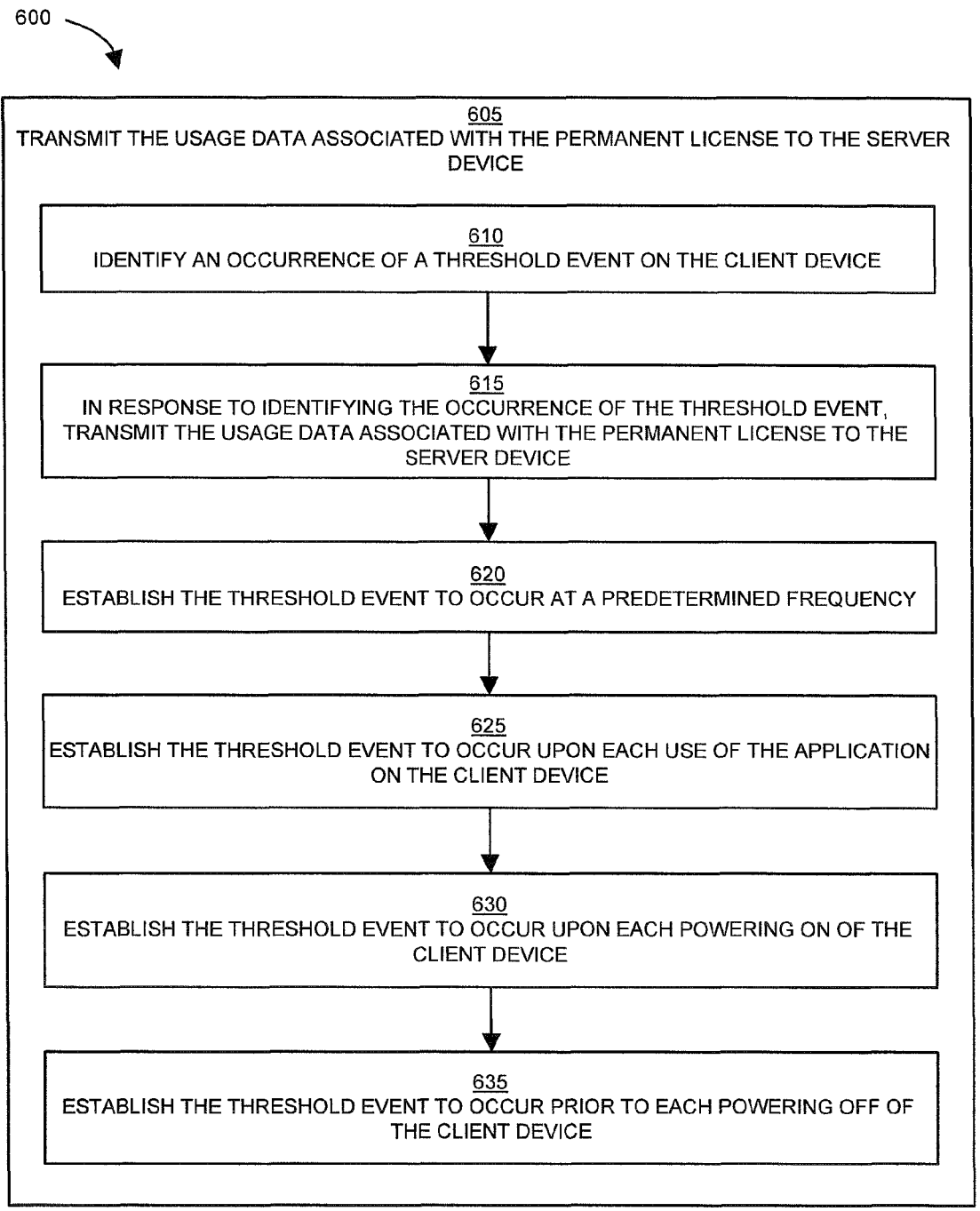
FIG. 6 is a flow chart of processing steps performed by a license manager from the perspective of the client device according to embodiments herein.

FIG. 6 is a flow chart of processing steps that shows processing operations performed by the license manager 150 from the perspective of the client device 180-1 in accordance with one example embodiment.

In step 605, the license manager 150 transmits the usage data 187 associated with the permanent license 182 to the server device 160. Processing of step 605 is similar to the processing of step 315 discussed above.

In step 610, the license manager 150 identifies an occurrence of a threshold event on the client device 180-1. As will be discussed in more detail below, in response to a threshold event, the license manager 150 procures the usage data 187 and subsequently transmits an unsolicited message containing the usage data 187 to the server device 160. The message is considered unsolicited for certain threshold events since it is not being transmitted in response to receiving a license query 155 from server device 160. Example threshold events are discussed in the following steps.

In step 615, in response to identifying the occurrence of the threshold event, the license manager 150 transmits the usage data 187 associated with the permanent license 182 to the server device 160. It should be noted be noted that in one example embodiment a threshold event may include the receipt of a license query 155 from the server device 160 as previously discussed.

In step 620, the license manager 150 establishes the threshold event to occur at a predetermined frequency. For example, the license manager 150 can establish the threshold event to occur once every hour, twice a day, bi-weekly, etc.

In step 625, the license manager 150 establishes the threshold event to occur upon each use of the application 185-1 on the client device 180-1. Thus, for example, a threshold event can occur when a user opens or starts the application 185-1, during use of the application 185-1, or after the application 185-1 has been closed or terminated by the user.

In step 630, the license manager 150 establishes the threshold event to occur upon each powering on of the client device 180-1 (e.g., when a laptop computer is turned on by a user).

In step 635, the license manager 150 establishes the threshold event to occur prior to each powering off of the client device 180-1 (e.g., when a desktop computer is turned off by a user).

Figure 7:
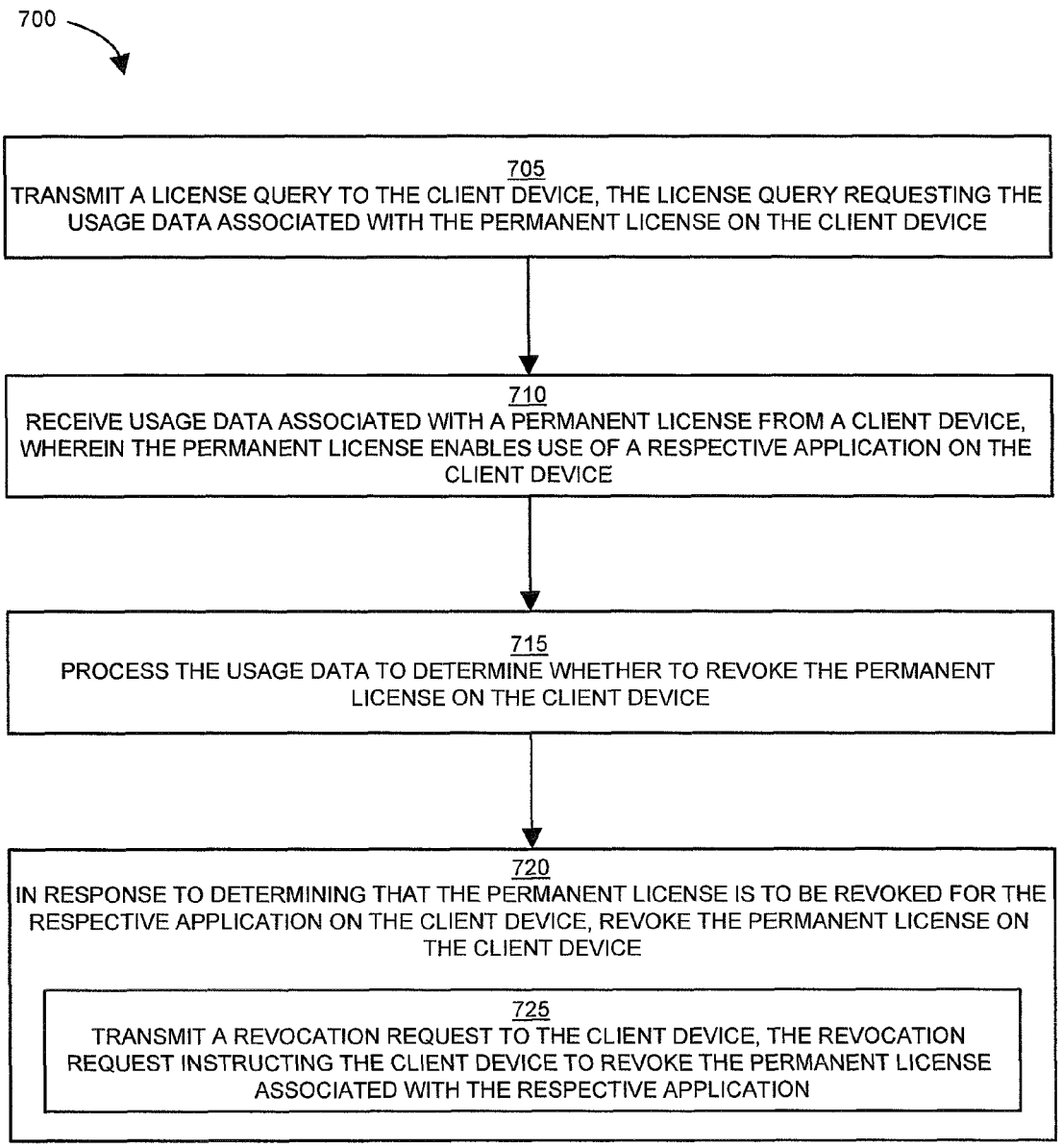
FIG. 7 is a flow chart of processing steps performed by a license manager from the perspective of a server device according to embodiments herein.

FIG. 7 is a flow chart of processing steps that shows processing operations performed by the license manager 150 from the perspective of the server device 160 in accordance with one example embodiment.

In step 705, the license manager 150 transmits a license query 155 to the client device 180-1. Generally, the purpose of the license query 155 is to request, for processing by the server device 160, the usage data 187 associated with the permanent license 182 on the client device 180-1. FIG. 1 shows an example embodiment where the license manager 150 transmits the license query 155 from the server device 160 to the client device 180-1 across network 170 (e.g., LAN, etc.). Note that the license query 155 can be transmitted to the client device 180-1 in response to a request for data by a user 108 (e.g., administrator) or upon the occurrence of a threshold event at the server device 160 similar to those previously described with respect to the client device 180-1.

In step 710, the license manager 150 receives the usage data 187 associated with a permanent license 182 from a client device 180-1. In one example embodiment, the usage data 187 is received at the server device 160 in response to a previous license query 155 transmitted by the license manager 150 to the client device 180-1. According to another example embodiment, the usage data 187 is received at the server device 160 as part of an unsolicited message transmitted from the client device 180-1 in response to the occurrence of a threshold event at the client device 180-1 (e.g., the powering on of client device 180-1).

In step 715, the license manager 150 processes the usage data 187 to determine whether to revoke the permanent license 182 on the client device 180-1. Details of such processing are discussed further below.

In step 720, in response to determining that the permanent license 182 is to be revoked for the respective application 185-1 on the client device 180-1, the license manager 150 revokes the permanent license 182 on the client device 180-1. Upon revocation of the permanent license 182, a user will not be able to access and/or use the corresponding application 185-1 (e.g., Adobe Acrobat®) on client device 180-1 until the license is renewed or a new license is activated.

In step 725, the license manager 150 transmits a revocation request 157 to the client device 180-1. The revocation request 157 instructs the client device 180-1 to revoke the permanent license 182 associated with the respective application 185-1. As shown in the example embodiment of FIG. 1, the license manager 150 transmits, from the server device 160, the revocation request 157 to client device 180-1 across network 170 (e.g., WAN).

Figure 8:
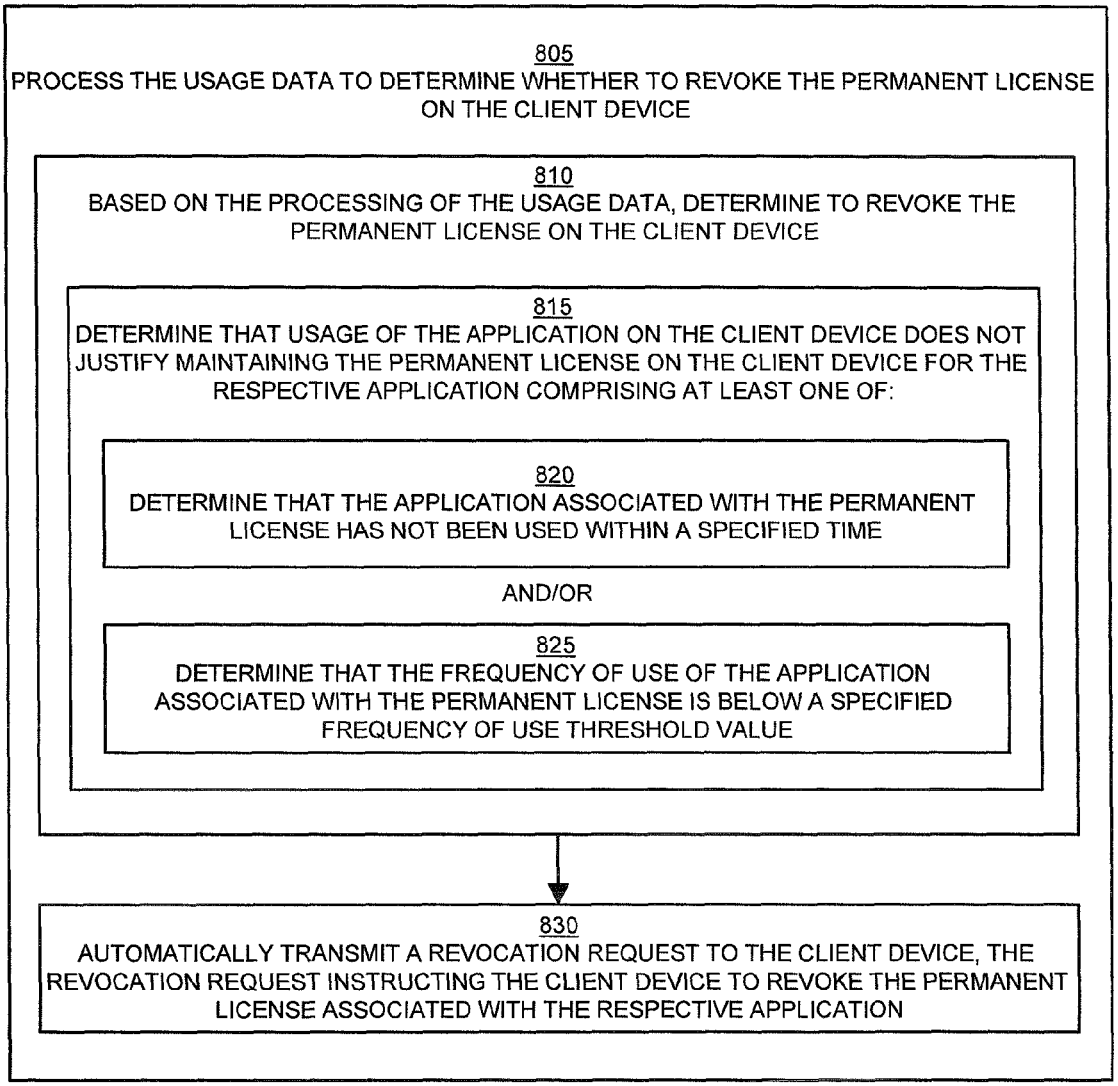
FIG. 8 is a flow chart of processing steps performed by a license manager from the perspective of a server device according to embodiments herein.

FIG. 8 is a flow chart of processing steps that shows processing operations performed by the license manager 150 from the perspective of the server device 160 in accordance with one example embodiment.

In step 805, the license manager 150 processes the usage data 187 to determine whether to revoke the permanent license 182 on the client device 180-1. Details of such processing are discussed further below.

In step 810, based on the processing of the usage data 187, the license manager 150 determines to revoke the permanent license 182 on the client device 180-1. In step 810, as well as in the following steps 815-830, the license manager 150 independently determines whether or not to revoke the permanent license 182 without human intervention. As such, the license manager 150 processes the usage data 187 to compare the usage statistics of the application 185-1 against predetermined threshold values and norms to render a decision regarding the revocation of permanent license 182 on client device 180-1.

In step 815, the license manager 150 determines that usage of the application 185-1 on the client device 180-1 does not justify maintaining the permanent license 182 on the client device 180-1 for the respective application 185-1. Details of how the license manager 150 justifies whether or not to maintain the permanent license 182 on the client device 180-1 are discussed in the steps below.

In step 820, the license manager 150 determines that the application 185-1 associated with the permanent license 182 has not been used within a specified time. For example, in one embodiment the license manager 150 uses the last use value (previously discussed in step 425) to determine if the application 185-1 has been used within a specified time frame. If the application 185-1 has not been used within the specified time frame, for instance, the license manager may determine to revoke the permanent license 182 on client device 180-1 so that the permanent license 182 may be used on other client devices (e.g., client device 180-2 or 180-3 in network environment 145) for the corresponding applications (e.g., application 185-2 and 185-3, respectively).

In step 825, the license manager 150 determines that the frequency of use of the application 185-1 associated with the permanent license 182 is below a specified frequency of use threshold value. As an example, in one embodiment the license manager 150 uses the usage counter value (previously discussed in steps 430 and 435) to determine if the application 185-1 has been used at a high enough frequency to justify maintaining the permanent license 182 on client device 180-1. If, for instance, the application 185-1 is rarely used on client device 180-1, the permanent license will likely be better suited for a client device 180 that requires more frequent usage of the application 185-1. Thus, if the frequency of use of the application 185-1 on client device 180-1 is below the threshold value, the license manager 150 may revoke the permanent license 182 and redistribute the permanent license 182 to another client device 180 in the network environment 145.

In step 830, the license manager 150 automatically transmits a revocation request 157 to the client device 180-1. The revocation request 157 instructs the client device 180-1 to revoke the permanent license 182 associated with the respective application 185-1. In this step, the license manager transmits the revocation request 157 (as shown in FIG. 1) to client device 180-1 without human intervention, in accordance with one example embodiment.

Figure 9:
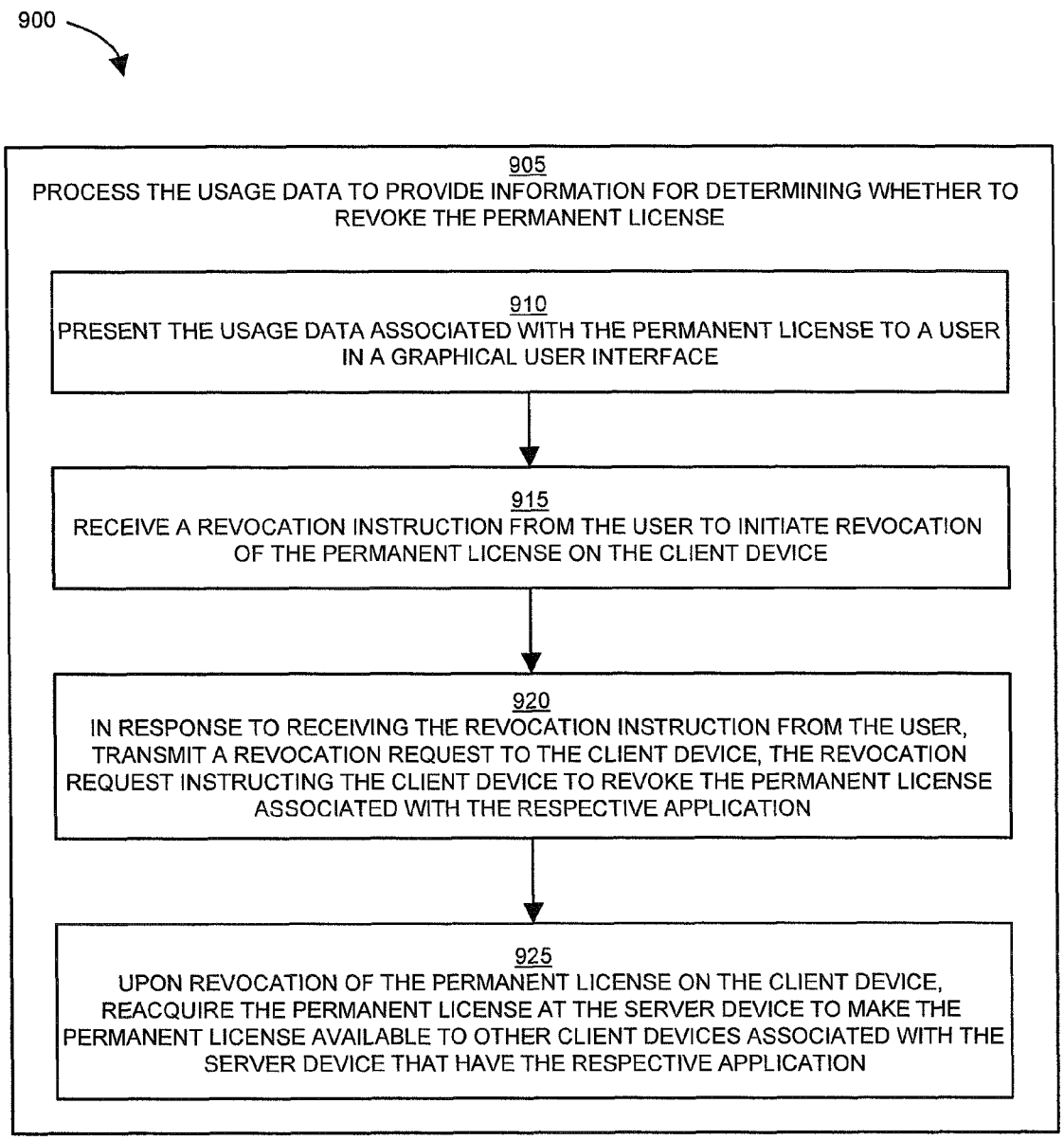
FIG. 9 is a flow chart of processing steps performed by a license manager from the perspective of a server device according to embodiments herein.

FIG. 9 is a flow chart of processing steps that shows processing operations performed by the license manager 150 from the perspective of the server device 160 in accordance with one example embodiment.

In step 905, the license manager 150 processes the usage data to provide information for determining whether to revoke the permanent license 182. Details of such processing are discussed further below.

In step 910, the license manager 150 presents the usage data 187 associated with the permanent license 182 to a user 108 (e.g., network or system administrator) in a graphical user interface (e.g., license management interface 130). With the graphical user interface (e.g., license management interface 130 as shown in FIGS. 1 and 2), the user 108 can interact with the usage data 187 so as to make a determination on whether or not to revoke the permanent license 182 on client device 180-1.

In step 915, the license manager 150 receives a revocation instruction 195 from the user 108 (e.g., network or system administrator) to initiate revocation of the permanent license 152 on the client device 180-1. In the example embodiment of FIG. 1, the user 108 enters the revocation instruction 195 via the license management interface 130 so that the license manager 150 can initiate revocation of the permanent license 182 on client device 180-1.

In step 920, in response to receiving the revocation instruction 195 from the user 108 (e.g., network or system administrator), the license manager 150 transmits a revocation request 157 to the client device 180-1. In this manner, similar to step 725, the revocation request 157 instructs the client device 180-1 to revoke the permanent license 182 associated with the respective application 185-1.

In step 925, upon revocation of the permanent license 152 on the client device 180-1, the license manager 150 reacquires the permanent license 152 at the server device 160 to make the permanent license 152 available to other client devices 180 associated with the server device 160 (and in network environment 145) that have the respective application 185.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims. Note that the different embodiments disclosed herein can be combined or utilized individually with respect to each other.

What we claim is:

1. A method comprising:

receiving a license query from a server device, the license query requesting usage data associated with a permanent license on a client device, wherein the permanent license enables use of a respective application on the client device;

in response to receiving the license query, procuring the usage data associated with the permanent license on the client device;

transmitting the usage data associated with the permanent license to the server device:

receiving a revocation request from the server device, the revocation request received in response to transmitting the usage data associated with the permanent license to the server device, the revocation request further indicating to the client device which permanent license to revoke;

revoking the permanent license that was indicated in the revocation request to disable use of the respective application on the client device; and wherein revoking the permanent license comprises;

releasing the permanent license associated with the respective application from the client device, wherein releasing the permanent license from the client device allows reacquisition of the permanent license by the server device.

2. The method of claim 1 further comprising:
wherein procuring the usage data associated with the permanent license on the client device comprises at least one of:
identifying a license type associated with the permanent license;
identifying an identification number associated with the permanent license;
identifying an expiration time associated with the permanent license, the expiration time indicating a time when the permanent license will expire for the respective application on the client device; and
identifying a last use value associated with the permanent license, the last use value indicating a time at which the respective application was last used on the client device;
for each use of the application on the client machine, incrementing a usage counter that indicates the number of uses of the application on the client device; and identifying the value of the usage counter to include in the usage data associated with the permanent license.

3. The method of claim 1 further comprising:
wherein procuring the usage data associated with the permanent license on the client device comprises:
querying a database on the client device in order to procure the usage data associated with the permanent license;
detecting an inconsistency in the database associated with the usage data; and
in response to detecting the inconsistency, transmitting an error report to the server device that identifies the inconsistency in the database associated with the usage data;
wherein detecting an inconsistency in the database associated with the usage data comprises at least one of:
detecting that at least a portion of the usage data in the database was corrupted;
detecting that at least a portion of the usage data in the database was deleted; and
detecting that at least a portion of the usage data is inaccessible.

4. The method of claim 1 further comprising:
wherein transmitting the usage data associated with the permanent license to the server device comprises:
identifying an occurrence of a threshold event on the client device;
in response to identifying the occurrence of the threshold event, transmitting the usage data associated with the permanent license to the server device; and
further comprising at least one of:
establishing the threshold event to occur at a predetermined frequency;
establishing the threshold event to occur upon each use of the application on the client device;
establishing the threshold event to occur upon each powering on of the client device; and
establishing the threshold event to occur prior to each powering off of the client device.

5. A method comprising:
transmitting a license query from a server device to a client device, the license query requesting usage data associated with a permanent license on the client device, wherein the permanent license enables use of a respective application on the client device;
receiving usage data associated with the permanent license from the client device, the usage data associated with the permanent license having been procured on the client device;
processing the usage data to determine whether to revoke the permanent license on the client device;
in response to determining that the permanent license is to be revoked for the respective application on the client device, revoking the permanent license on the client device;
revoking the permanent license comprising:
transmitting a revocation request from the server device to the client device, the revocation request transmitted in response to receiving the usage data associated with the permanent license to the server device, the revocation request further indicating to the client device which permanent license to revoke, the revocation request further instructing the client device to revoke the permanent license that was indicated in the revocation request to disable use of the respective application on the client device, the revocation request further instructing the client device to release the permanent license associated with the respective application from the client device, wherein releasing the permanent license from the client device allows reacquisition of the permanent license by the server device.

6. The method of claim 5 wherein determining to revoke the permanent license on the client device comprises:
determining that usage of the application on the client device does not justify maintaining the permanent license on the client device for the respective application.

7. The method of claim 6 wherein determining that usage of the application on the client device does not justify maintaining the permanent license on the client device for the respective application comprises at least one of:
determining that the application associated with the permanent license has not been used within a specified time; and
determining that the frequency of use of the application associated with the permanent license is below a specified frequency of use threshold value.

8. The method of claim 5 wherein processing the usage data to provide information for determining whether to revoke the permanent license comprises:
presenting the usage data associated with the permanent license to a user in a graphical user interface;
receiving a revocation instruction from the user to initiate revocation of the permanent license on the client device; and
in response to receiving the revocation instruction from the user, transmitting a revocation request to the client device, the revocation request instructing the client device to revoke the permanent license associated with the respective application.

9. The method of claim 8 further comprising:
upon revocation of the permanent license on the client device, reacquiring the permanent license at the server device to make the permanent license available to other client devices associated with the server device that have the respective application.

10. The method of claim 5 wherein revoking the permanent license on the client device comprises:
transmitting a revocation request to the client device, the revocation request instructing the client device to revoke the permanent license associated with the respective application.

11. A computer system comprising:
a server device comprising:
a server memory;
a server processor;
a server communications interface;

a server interconnection mechanism coupling the server memory, the server processor and the server communications interface; and a client device comprising:
  a client memory;
  a client processor;
  a client communications interface;
  a client interconnection mechanism coupling the client memory, the client processor and the client communications interface; and wherein the server memory and client memory are encoded with a license manager application that when executed on the server processor and client processor provide a license manager process causing the server device and client device to be capable of performing the operations of:

transmitting, from the server device, a license query to the client device, the license query requesting usage data associated with a permanent license on the client device;

receiving, at the client device, the license query from the server device, the permanent license enabling use of a respective application on the client device;

in response to receiving the license query, procuring the usage data associated with the permanent license on the client device;

transmitting, from the client device, the usage data associated with the permanent license to the serve device;

receiving, at the server device, the usage data associated with the permanent license from the client device;

processing the usage data at the server to determine whether to revoke the permanent license on the client device;

in response to determining that the permanent license is to be revoke for the respective application on the client device, transmitting a revocation request to the client device, the revocation request instructing the client device to revoke the permanent license associated with the respective application;

receiving, at the client device, the revocation request from the server device, the revocation request received in response to transmitting the usage data associated with the permanent license to the server device, the revocation request further indicating to the client device which permanent license to revoke;

revoking the permanent license that was indicated in the revocation request to disable use of the respective application on the client device; and wherein revoking the permanent license comprises;
    releasing the permanent license associated with the respective application from the client device, wherein releasing the permanent license from the client device allows reacquisition of the permanent license by the server device.

12. A computer program product having a non-transitory computer readable medium, when executed by a computer operable to store computer program logic embodied in computer program code encoded thereon as an encoded set of processor based instructions for license management comprising:

computer program code for receiving a license query from a server device, the license query requesting usage data associated with a permanent license on a client device, wherein the permanent license enables use of a respective application on the client device;

in response to receiving the license query, computer program code for procuring the usage data associated with the permanent license on the client device;

computer program code for transmitting the usage data associated with the permanent license to the server device;

computer program code for receiving a revocation request from the server device, the revocation request received in response to transmitting the usage data associated with the permanent license to the server device the revocation request further indicating to the client device which permanent license to revoke;

computer program code for revoking the permanent license that was indicated in the revocation request to disable use of the respective application on the client device; and wherein computer program code for revoking the permanent license comprises;
    computer program code for releasing the permanent license associated with the respective application from the client device, wherein releasing the permanent license from the client device allows reacquisition of the permanent license by the server device.

13. A computer program product having a non-transitory computer readable medium, when executed by a computer operable to store computer program logic embodied in computer program code encoded thereon as an encoded set of processor based instructions for license management comprising:

computer program code for transmitting a license query from a server device to a client device, the license query requesting usage data associated with a permanent license on the client device, wherein the permanent license enables use of a respective application on the client device;

computer program code for receiving usage data associated with the permanent license from the client device, the usage data associated with the permanent license having been procured on the client device;

computer program code for processing the usage data to determine whether to revoke the permanent license on the client device;

in response to determining that the permanent license is to be revoked for the respective application on the client device, computer program code for revoking the permanent license on the client device;

computer program code for revoking the permanent license comprising:
    computer program code for transmitting a revocation request from the server device to the client device, the revocation request transmitted in response to receiving the usage data associated with the permanent license to the server device, the revocation request further indicating to the client device which permanent license to revoke, the revocation request further instructing the client device to revoke the permanent license that was indicated in the revocation request to disable use of the respective application on the client device, the revocation request further instructing the client device to release the permanent license associated with the respective application from the client device, wherein releasing the permanent license from the client device allows reacquisition of the permanent license by the server device.

14. The method of claim 1, further comprising:
  wherein procuring the usage data associated with the permanent license on the client device comprises:

identifying a license type associated with the permanent license;

identifying an identification number associated with the permanent license;

identifying an expiration time associated with the permanent license, the expiration time indicating a time when the permanent license will expire for the respective application on the client device; and identifying a last use value associated with the permanent license, the last use value indicating a time at which the respective application was last used on the client device;

for each use of the application on the client machine, incrementing a usage counter that indicates the number of uses of the application on the client device; and identifying the value of the usage counter to include in the usage data associated with the permanent license.

15. The method of claim 14, further comprising:

wherein transmitting the usage data associated with the permanent license to the server device comprises:

identifying an occurrence of a threshold event on the client device; and in response to identifying the occurrence of the threshold event, transmitting the usage data associated with the permanent license to the server device;

further comprising at least one of:

establishing the threshold event to occur at a predetermined frequency;

establishing the threshold event to occur upon each use of the application on the client device;

establishing the threshold event to occur upon each powering on of the client device; or establishing the threshold event to occur prior to each powering off of the client device.

16. The method of claim 15 further comprising:

wherein procuring the usage data associated with the permanent license on the client device comprises:

querying a database on the client device in order to procure the usage data associated with the permanent license;

detecting an inconsistency in the database associated with the usage data; and in response to detecting the inconsistency, transmitting an error report to the server device that identifies the inconsistency in the database associated with the usage data;

wherein detecting an inconsistency in the database associated with the usage data comprises at least one of:

detecting that at least a portion of the usage data in the database was corrupted;

detecting that at least a portion of the usage data in the database was deleted; or detecting that at least a portion of the usage data is inaccessible.

17. The computer system of claim 11, further encoded for performing the operations comprising:

wherein processing the usage data at the server device to determine whether to revoke the permanent license on the client device comprises:

based on the processing of the usage data, determining to revoke the permanent license on the client device;

automatically transmitting a revocation request to the client device, the revocation request instructing the client device to revoke the permanent license associated with the respective application;

wherein determining to revoke the permanent license on the client device comprises:

determining that usage of the application on the client device does not justify maintaining the permanent license on the client device for the respective application;

wherein determining that usage of the application on the client device does not justify maintaining the permanent license on the client device for the respective application comprises at least one of:

determining that the application associated with the permanent license has not been used within a specified time; or determining that the frequency of use of the application associated with the permanent license is below a specified frequency of use threshold value.

18. The computer system of claim 11, further encoded for performing the operations comprising:

wherein processing the usage data to provide information for determining whether to revoke the permanent license comprises:

presenting the usage data associated with the permanent license in a graphical user interface;

receiving a revocation instruction, via the graphical user interface, to initiate revocation of the permanent license on the client device; and in response to receiving the revocation instruction via the graphical user interface, transmitting a revocation request to the client device, the revocation request instructing the client device to revoke the permanent license associated with the respective application.

* * * * *